(12) United States Patent
Acharya Chandrashekar et al.

(10) Patent No.: US 12,206,835 B2
(45) Date of Patent: Jan. 21, 2025

(54) MITIGATION OF CAMERA FAILURE DURING VOLUMETRIC VIDEO CAPTURE

(71) Applicant: International Business Machines Corporation, Armonk, NY (US)

(72) Inventors: Charan Acharya Chandrashekar, Bangalore (IN); Shridhara Hegde, Bengaluru (IN); Pydimarri Venkata Anantha Sai Avinash, Podili (IN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 18/331,441

(22) Filed: Jun. 8, 2023

(65) Prior Publication Data

US 2024/0414310 A1    Dec. 12, 2024

(51) Int. Cl.
    *H04N 13/296*       (2018.01)
    *H04N 13/243*       (2018.01)

(52) U.S. Cl.
    CPC ......... *H04N 13/296* (2018.05); *H04N 13/243* (2018.05)

(58) Field of Classification Search
    CPC ........................... H04N 13/296; H04N 13/243
    See application file for complete search history.

(56) References Cited

U.S. PATENT DOCUMENTS

| | | | |
|---|---|---|---|
| 9,986,221 B2 | 5/2018 | Zhou | |
| 10,469,820 B2 | 11/2019 | Jiang | |
| 10,818,077 B2 | 10/2020 | Downing | |
| 11,232,583 B2 | 1/2022 | Narasimha | |
| 2020/0388068 A1 | 12/2020 | Yeung | |
| 2021/0037168 A1 | 2/2021 | Mathur | |

FOREIGN PATENT DOCUMENTS

EP     3062148 B1     12/2020

OTHER PUBLICATIONS

Antunes, Jose, "Canon and IBM: using volumetric video to promote visual arts", ProVideo Coalition By Filmtools, Jul. 13, 2021, 4 Pages.

(Continued)

*Primary Examiner* — Thai Q Tran
*Assistant Examiner* — Jose M Mesa
(74) *Attorney, Agent, or Firm* — Anthony M. Pallone (57) ABSTRACT

According to one embodiment, a method, computer system, and computer program product for mitigating a camera failure during volumetric capture is provided. The embodiment may include monitoring respective status of functionality (SoF) array data structures of a set of cameras tasked with capturing volumetric video of a scene. The set of cameras comprises cameras designated as backup cameras and cameras designated for active volumetric capture. The embodiment may include detecting a failed camera of the cameras designated for active volumetric capture based on evaluation of an SoF array data structure of the failed camera. In response to detecting the failed camera, the embodiment may include determining whether a backup camera of the cameras designated as backup cameras is available to replace the failed camera. In response to determining the backup camera is available, the embodiment may include replacing the failed camera with the backup camera.

20 Claims, 3 Drawing Sheets

(56) References Cited

OTHER PUBLICATIONS

Leonard, Marie-Anne, "Watching from within at Canon's volumetric video studio", Canon Europe, 2023, 1 Page.
SMPTE, "Capturing volumetric video", SMPTE Content, Sep. 21, 2020, 9 Pages.
International Searching Authority, "Notification of Transmittal of the International Search Report and the Written Opinion of the International Searching Authority, or Declaration," Patent Cooperation Treaty, Aug. 21, 2024, 12 pages, International Application No. PCT/EP2024/064573.
Zhang et al., "Predicting Failures of Vision Systems", IEEE Conference on Computer Vision and Pattern Recognition, 2014, pp. 3566-3573.

MITIGATION OF CAMERA FAILURE DURING VOLUMETRIC VIDEO CAPTURE

BACKGROUND

The present invention relates generally to the field of computing, and more particularly to digital capture of volumetric video.

Volumetric video (i.e., volumetric capture) refers to a technology that captures a three-dimensional (3D) representation of a person or object in a real-world space. It involves the use of multiple cameras or depth sensors to capture a subject from different angles and create a volumetric representation. This representation can be viewed from any perspective, allowing users to experience captured video content in a more immersive and interactive way. While traditional video recordings are captured from a fixed perspective and viewed on a two-dimensional (2D) screen, volumetric video captures a scene from multiple viewpoints using an array of cameras or depth sensors placed around the subject. These cameras capture the person or object from different angles simultaneously, thus creating a 3D representation. Volumetric video has various applications across industries such as entertainment, gaming, virtual reality (VR), augmented reality (AR), teleconferencing, and education. It enables realistic virtual experiences where users can explore and interact with 3D video content in a more natural way.

SUMMARY

According to one embodiment, a method, computer system, and computer program product for mitigating a camera failure during volumetric capture is provided. The embodiment may include monitoring respective status of functionality (SoF) array data structures of a set of cameras tasked with capturing volumetric video of a scene. The set of cameras comprises cameras designated as backup cameras and cameras designated for active volumetric capture. The embodiment may include detecting a failed camera of the cameras designated for active volumetric capture based on evaluation of an SoF array data structure of the failed camera. In response to detecting the failed camera, the embodiment may include determining whether a backup camera of the cameras designated as backup cameras is available to replace the failed camera. In response to determining the backup camera is available, the embodiment may include replacing the failed camera with the backup camera.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to volumetric video capture. The following described exemplary embodiments provide a system, method, and program product to, among other things, mitigate camera failures while capturing volumetric video by replacing a failed camera or by repositioning existing operational cameras based on their respective technical attributes. Therefore, the present embodiment has the capacity to improve the technical field of volumetric video capture by dynamically alleviating, in real-time, the effects of one or more camera failures during volumetric video capture, thus minimizing, or eliminating potential loss of volumetric video content due to a camera failure.

As previously described, volumetric video (i.e., volumetric capture) refers to a technology that captures a 3D representation of a person or object in a real-world space. It involves the use of multiple cameras or depth sensors to capture a subject from different angles and create a volumetric representation. This representation can be viewed from any perspective, allowing users to experience captured video content in a more immersive and interactive way. While traditional video recordings are captured from a fixed perspective and viewed on a 2D screen, volumetric video captures a scene from multiple viewpoints using an array of cameras or depth sensors placed around the subject. These cameras capture the person or object from different angles simultaneously, thus creating a 3D representation. Volumetric video has various applications across industries such as entertainment, gaming, VR, AR, teleconferencing, and education. It enables realistic virtual experiences where users can explore and interact with 3D video content in a more natural way.

As volumetric video captures a scene from multiple viewpoints using an array of cameras placed around the subject, a failure of any of the cameras may adversely affect a final rendering of the scene. As with any other electronic device, cameras of the array may be prone to various types of operation failures (e.g., zooming capability may fail, movement related capability may fail, software may fail, physical damages may occur). A partial or complete failure in any type of camera operation may result in the final rendering being incomplete (i.e., missing video content). As such, missing video content may have to be recaptured which may be a tedious process and incur additional cost. Moreover, if live video is being captured and streamed, then any part of the scene that is designated to be captured by a failed camera will be missed and negatively affect the quality of the video stream. It may therefore be imperative to have a volumetric video capture system in place to minimize or eliminate loss of video content by proactively handling an operation failure of a camera during volumetric video capture. Thus, embodiments of the present invention may be advantageous to, among other things, prioritize content (i.e., areas/objects) of a scene which is subject to volumetric capture by a set of cameras, leverage historical scene viewing patterns of users, utilize machine learning (ML) object detection models to classify/tag objects of a scene, define a respective status of functionality (SoF) data structure for each camera of a set of cameras, monitor multiple real-time feeds or operations of cameras while capturing volumetric video, define a similarity matrix which indicates similarities between all cameras of a set, group cameras of a set based on their similarities, detect an operation failure of a camera via it's respective SoF data structure, replace a failed camera with a backup camera based on analysis of their respective SoF data structures and reference to a similarity matrix of the cameras, reposition placement and/or orientation of existing fully operational cameras of a set based on priorities of respectively captured content, and predict future camera operation failures based on ML analysis of historical data sets. The present invention does not require that all advantages need to be incorporated into every embodiment of the invention.

According to at least one embodiment, an array of multiple cameras may be set up to capture volumetric video of a scene from different angles. A volumetric video capture program may assign various capture priorities to different areas of the scene and additionally tag objects within the scene based on capture priority. For each camera of the array, the volumetric video capture program may define a SoF data structure (e.g., an array) which includes binary values that are individually indicative of a real-time status of a specified aspect of camera operation. Further, according to at least one embodiment, the volumetric video program may create a similarity matrix (i.e., a similarity index) for cameras of the array. The similarity matrix may identify similarity values between any two cameras of the array based on their respective technical specifications and capabilities. Additionally, the volumetric video capture program may group cameras of the array based on similarity values.

According to at least one other embodiment, while volumetric video of a scene is being captured by active cameras of an array, the volumetric video capture program may continuously monitor real-time video feeds of the active cameras, as well as monitor values of their respective SoF data structures, for detection of any camera operation failures. In response to a detected operation failure of an active camera, the volumetric video capture program may replace the failed camera with a backup camera based on analysis of their respective SoF data structures and similarities between the cameras. The backup camera may be a camera of the array that was previously designated as a backup. Further, the backup camera may have a high similarity value with the failed camera and have a SoF data structure which is complementary to the SoF data structure of the failed camera. According to at least one further embodiment, where a backup camera is not available to replace the failed camera, the volumetric video capture program may replace the failed camera with another camera of the array, which is in a same group of the failed camera, that is actively capturing video content having the lowest capture priority of the scene. Alternatively, where a backup camera is not available to replace the failed camera, the volumetric video capture program may rearrange the cameras of the array which are currently capturing volumetric video in such a way that content (e.g., an area of the scene) lost by the failed camera is captured by the rest of the cameras through repositioning the cameras farther away from the scene such that the scene area covered by each camera increases.

According to yet another embodiment, the volumetric video capture program may utilize one or more existing ML models, in conjunction with monitoring various camera functionality statuses (i.e., SoF data structure values), to predict failure(s) that may later occur within the cameras of the array. The volumetric video capture program may train an ML model using historical data sets of the cameras' respective past operations. In response to a predicted camera failure, the volumetric video capture program may replace a failed camera or rearrange cameras of the array as described in above embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to mitigate current or predicted camera/sensor failures while capturing volumetric video of a scene.

Figure 1:
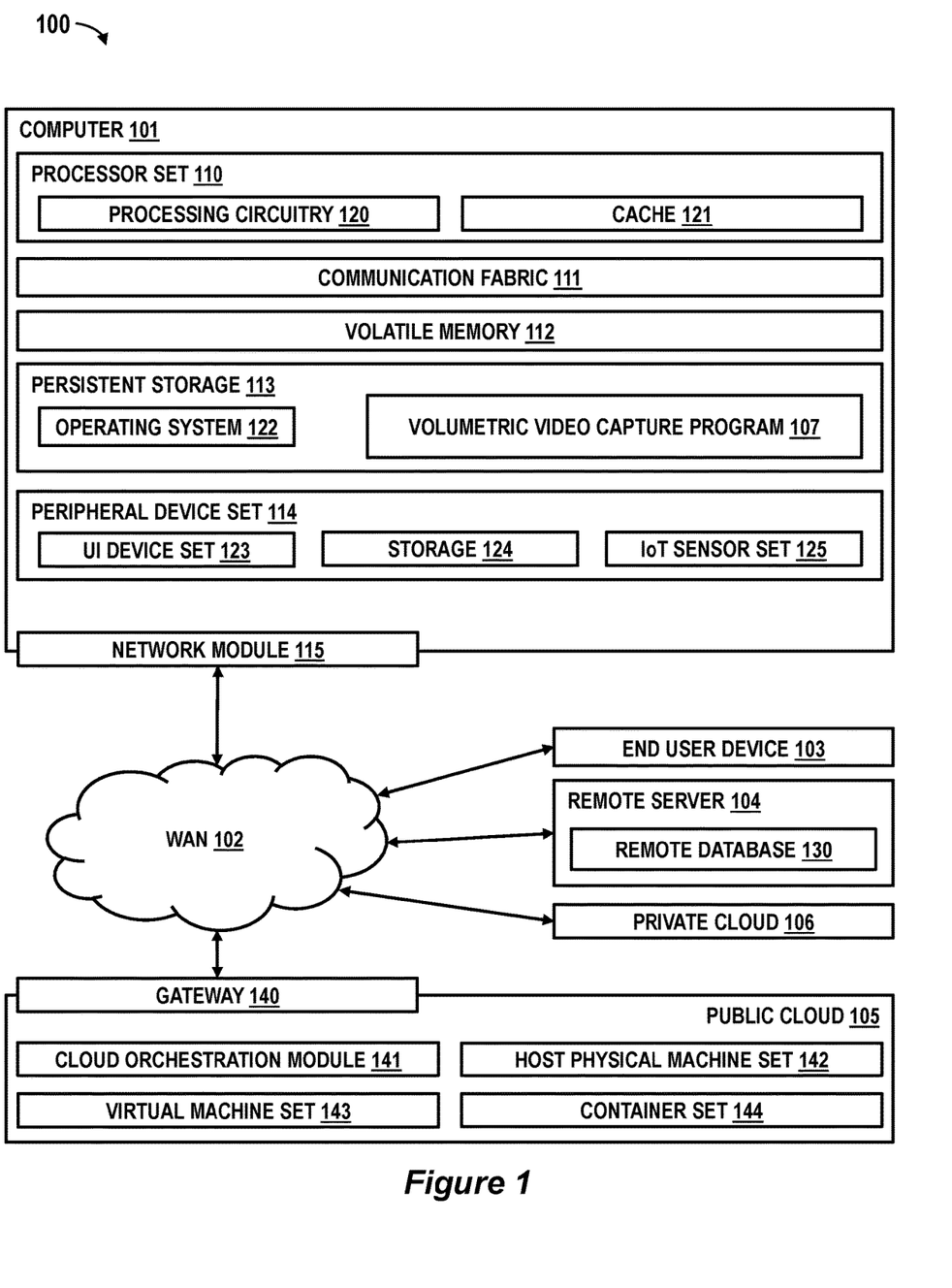
FIG. 1 illustrates an exemplary computer environment according to at least one embodiment.

Referring to FIG. 1, an exemplary computing environment 100 is depicted, according to at least one embodiment. Computing environment 100 contains an example of an environment for the execution of at least some of the computer code involved in performing the inventive methods, such as volumetric video capture (VVC) program 107. In addition to VVC program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and VVC program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. Additionally, computer 101 may be any other form of computer or mobile device now known or to be developed in the future that is AR/VR-enabled. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in VVC program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in VVC program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be an IoT-enabled mobile or fixed digital image capture device (e.g., a camera, sensor) capable of capturing volumetric video of a scene, connecting to computer 101 via WAN 102 and network module 115, and capable of receiving instructions from VVC program 107. In an embodiment where EUD 103 is an IoT-enabled mobile digital image capture device, EUD 103 may be mounted to a mobile platform (e.g., an unmanned aerial or wheeled vehicle) capable of performing movement along an x, y, and z axis. Furthermore, where EUD 103 is an IoT-enabled mobile or fixed digital image capture device, EUD 103 may also be capable of rotational movement (i.e., pitch, yaw, and roll). Although only a single EUD 103 is depicted, computing environment 100 may include a plurality of EUDs 103 (e.g., a plurality of mobile and fixed IoT-enabled digital image capture devices for volumetric capture).

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The VVC program 107 may be a program capable of prioritizing content (i.e., areas/objects) of a scene which is subject to volumetric capture by a set of cameras, leveraging historical scene viewing patterns of users to assess content prioritization, utilizing machine learning (ML) object detection models to classify/tag objects of a scene, defining a respective status of functionality (SoF) data structure for each camera of a set of cameras capturing volumetric video, monitoring multiple real-time feeds or operations of cameras while capturing volumetric video, defining a similarity matrix which indicates similarities between all cameras of a set, grouping cameras of a set based on their similarities, detecting an operation failure of a camera via it's respective SoF data structure, replacing a failed camera with a backup camera based on analysis of their respective SoF data structures and reference to a similarity matrix of the cameras, repositioning placement and/or orientation of existing fully operational cameras of a set based on their respective camera groupings and priorities of respectively captured content, and predicting future camera operation failures based on ML analysis of historical data sets of past camera operations. In at least one embodiment. VVC program 107 may require a user to opt-in to system usage upon opening or installation of VVC program 107. Notwithstanding depiction in computer 101, VVC program 107 may be stored in and/or executed by, individually or in any combination, end user device 103, remote server 104, public cloud 105, and private cloud 106 so that functionality may be separated among the devices. The volumetric video capture method is explained in further detail below with respect to FIGS. 2 and 3.

Figure 2:
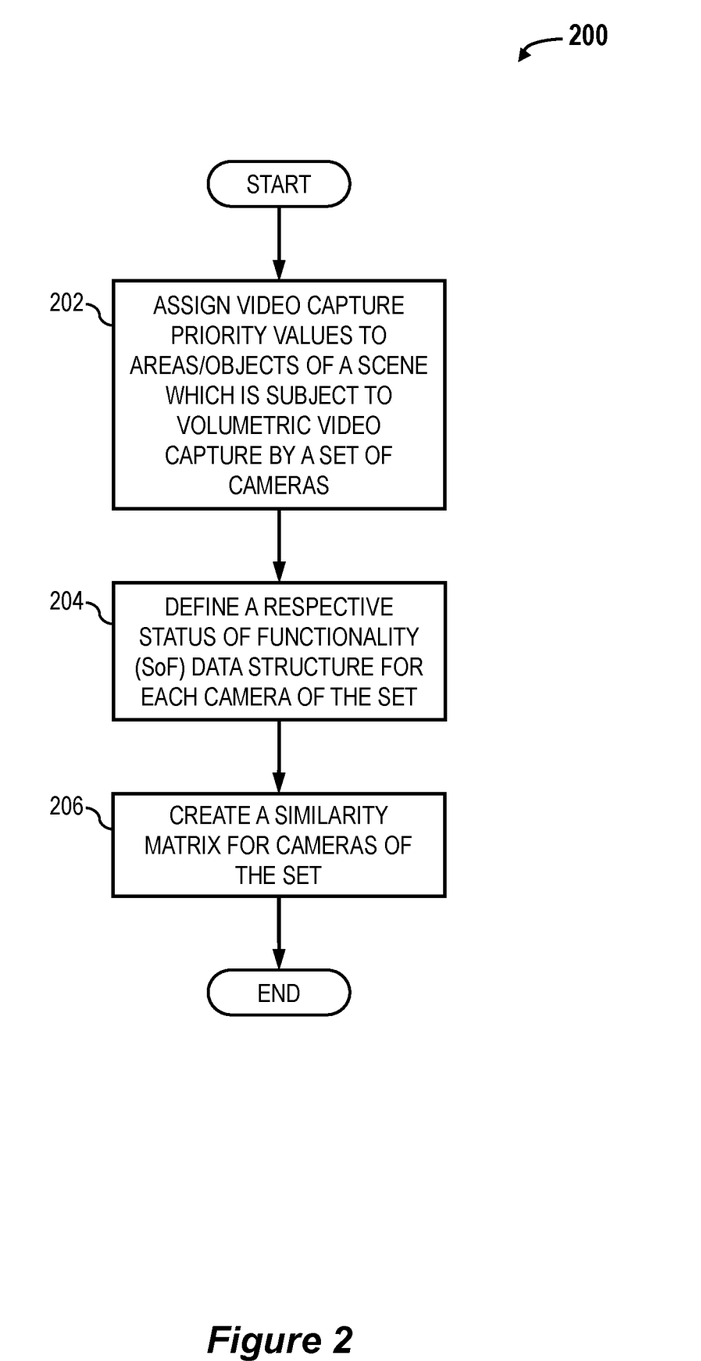
FIG. 2 illustrates an operational flowchart for initializing a volumetric video capture system via a volumetric video capture initialization process according to at least one embodiment.

Referring now to FIG. 2, an operational flowchart for initializing a volumetric video capture system via a volumetric video capture initialization process 200 is depicted according to at least one embodiment. At 202, VVC program 107 automatically assigns video capture priority values to areas and/or objects of a scene which is subject to volumetric video capture by a set of identifiable cameras (e.g., a plurality of EUDs 103 each with a unique identifier). The camera set may include mobile and fixed cameras having varied or similar respective technical capabilities. Also, some cameras of the set may be designated as backup cameras while others of the set may be designated for active volumetric capture. Cameras of the set designated for active volumetric capture may be respectively positioned around the scene for the purpose of capturing volumetric video of respectively assigned portions of the scene, as instructed by VVC program 107. For example, cameras of the set may be placed throughout an environment surrounding the scene at desired heights and depths, with respect to areas and/or objects of the scene, to enable up to 360 degrees of volumetric video capture of the scene. According to at least one embodiment, prioritization, by VVC program 107, of areas and/or objects of the scene may be automatically performed before volumetric capture of the scene begins such that important content or objects within areas are already identified. VVC program 107 may leverage ML analysis of historical scene viewing patterns of users, in the context of the scene and/or similar scenes, when automatically assigning video capture priority values to areas and/or objects of the scene. For example, VVC program 107 may assign an area of the scene historically viewed by a majority of users a highest capture priority value. Conversely, an area of the scene historically viewed by a minimum of users may be assigned a lowest capture priority. Additionally, an area and/or object of the scene that can be generated using known artificial intelligence (AI)/ML generative models (e.g., in post-production of captured volumetric video) may be assigned, by VVC program 107, a lowest capture priority value. According to at least one other embodiment, VVC program 107 may receive manually specified capture priority values for areas and/or objects of the scene (e.g., from a creator of the captured volumetric video). A table of assigned video capture priorities of areas and/or objects of the scene, along with their respective scene portion camera assignments, may be stored within storage 124 and/or remote database 130 and may be created and accessed (e.g., referenced, updated) by VVC program 107 during volumetric video capture initialization process 200 and volumetric video capture process 300, described below.

Also at 202, according to at least one embodiment, VVC program 107 may utilize known object detection models to tag/classify both static and moving objects of the scene and assign their respective capture priority values based, at least in part, on their respective tags/classifications. Moreover, an area of the scene containing a tagged/classified object may assume, at least temporarily, the capture priority value of the tagged/classified object. For example, where a moving object has been tagged and assigned a highest capture priority value, VVC program 107 may assign/update an area containing the tagged object (as it moves throughout the scene) with the same capture priority value as the tagged object for as long as the tagged object is contained in the area. Once the tagged object has left the area, VVC program 107 may revert the capture priority value of the area to its previously assigned value.

Next, at 204, VVC program 107 defines a respective status of functionality (SoF) data structure for each camera of the set of cameras tasked with capturing volumetric video of the scene. According to at least one embodiment, an SoF data structure for a camera may be an array which includes binary values that are individually indicative of a real-time status of a specified technical capability/aspect of camera operation. For example, an SoF array data structure of a camera may include, but is not limited to, one or more respective binary elements representative of x-axis movement, y-axis movement, z-axis movement, pitch, yaw, roll, zoom status, software status, power status, communication status, memory status, and physical damage (e.g., lens damage). A false value for an element may indicate a failure of the technical capability/functionality represented by that element. VVC program 107 may define respective SoF data structures for cameras of the set designated as backup cameras as well as cameras of the set designated for active volumetric capture. According to at least one embodiment, technical capabilities of each camera of the set may be identified by VVC program 107 when defining respective SoF data structures during the volumetric video capture initialization process. Also, VVC program 107 may continuously monitor/receive real-time statuses of identified technical capabilities of/from each camera of the set and automatically update respective SoF data structures. Defined SoF data structures may be stored within storage 124 and/or remote database 130 and may be accessed (e.g., referenced, updated) by VVC program 107 during volumetric video capture initialization process 200 and volumetric video capture process 300, described below.

At 206, VVC program 107 creates a similarity matrix for all cameras of the set of cameras tasked with capturing volumetric video of the scene. According to at least one embodiment, the similarity matrix may provide an index of similarity values which denote a level of similarity between any two cameras of the set. The similarity matrix may be a table of values calculated by evaluating various functional capabilities (e.g., max-resolution, digital picture quality, levels of zoom, range of view, ranges of movement, etc.) offered by each camera. For example, if a set of cameras includes a first camera, a second camera, and a third camera, VVC program 107 may evaluate and compare the respective technical capabilities/aspects of each camera and, accordingly, calculate separate similarity values between the first camera and the second camera, the first camera and the third camera, the second camera and the first camera, the second camera and the third camera, the third camera and the first camera, and the third camera and the second camera. The higher the similarity value between two cameras, the greater the similarity between them. Likewise, the lower the similarity value between two cameras, the smaller the similarity between them. The created similarity matrix may be stored within storage 124 and/or remote database 130 and may be accessed (e.g., referenced, updated) by VVC program 107 during volumetric video capture initialization process 200 and volumetric video capture process 300, described below. Furthermore, according to at least one embodiment, VVC program 107 may assign cameras of the set to one or more groups based on respective similarity values between cameras of a group meeting or exceeding a threshold similarity value or based on respective similarity values between cameras of a group being within a threshold range. In doing so, VVC program 107 may ensure that cameras of a group within the set have sufficiently similar technical capabilities with respect to each other. Group assignments for cameras of the set may be stored within storage 124 and/or remote database 130 and may be accessed (e.g., referenced, updated) by VVC program 107 during volumetric video capture initialization process 200 and volumetric video capture process 300, described below.

Figure 3:
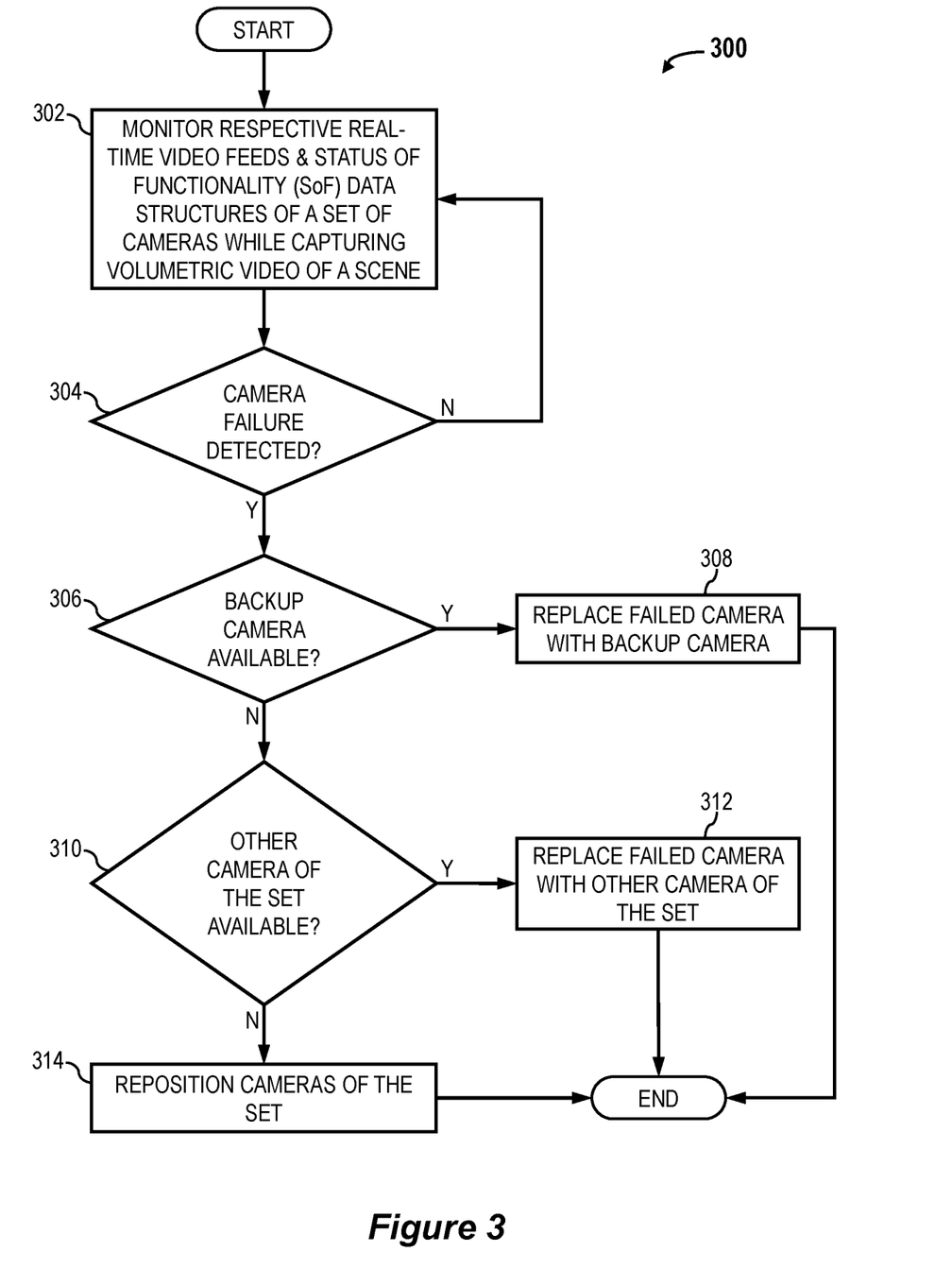
FIG. 3 illustrates an operational flowchart for mitigating a failure of a camera while capturing volumetric video via a volumetric video capture process according to at least one embodiment.

Referring now to FIG. 3, an operational flowchart for mitigating a failure of a camera while capturing volumetric video via a volumetric video capture process 300 is depicted according to at least one embodiment. At 302, VVC program 107 monitors respective real-time video feeds and SoF data structures of a set of cameras (e.g., a plurality of EUDs 103) capturing volumetric video of a scene. The set of cameras may have been positioned and initialized according to the volumetric video capture initialization process 200 described above. During the capture of volumetric video, VVC program 107 may continuously monitor real-time video feeds and real-time SoF data structure statuses of cameras of the set to detect any failures or errors (e.g., lost pixels) of the cameras. As with any other electronic devices, cameras of the set may experience failures of various types. For example, a camera of the set may experience a zooming capability failure, a movement (i.e., linear and/or rotational) failure, a software related failure, and/or physical damage. A partial or complete failure of a camera may result in a final rendering of the scene being incomplete.

Next, at 304, VVC program 107 determines whether a failure of a camera of the set has been detected. In making this determination, VVC program 107 may reference the respective real-time SoF data structure statuses of cameras of the set which are designated for active volumetric capture. As noted above, an SoF array data structure of a camera may include binary values that are individually indicative of a real-time status of a specified technical capability of camera operation, and a false value (e.g., 0) for an element may indicate a failure of the technical capability represented by that element. According to at least one embodiment, VVC program 107 may determine a specified failure of a camera exists where an element of the SoF array data structure of the camera has a 0 value. A partial failure may exist where at least one element of the SoF array data structure has a 0 value and a complete failure may exist where every element of the SoF array data structure has a 0 value. According to at least one other embodiment, VVC program 107 may determine a failure of a camera exists based on the monitored real-time video feed of the camera (e.g., the video feed may be disrupted, out of focus, and/or not depicting instructed perspective changes). In response to determining that a failure of a camera of the set has not been detected (i.e., the respective SoF data structures of the cameras do not contain any 0-valued elements) (step 304, "N" branch), the volumetric video capture process 300 may return to step 302 to continue monitoring respective real-time video feeds and SoF data structures of cameras of the set. In response to determining that a failure of a camera has been detected (step 304, "Y" branch), the volumetric video capture process 300 may proceed to step 306.

According to at least one further embodiment, in response to determining that a failure of a camera has been detected, VVC program 107 may additionally update the SoF array data structure of the camera and, accordingly, update a similarity matrix of the cameras of the set and/or group assignments for cameras of the set created during the volumetric video capture initialization process 200. For example, VVC program 107 may remove the failed camera from an assigned grouping and/or update similarity values for the failed camera, with respect to the other cameras of the set, in response to the detected failure.

At 306, VVC program 107 determines whether a camera of the set which has been designated as a backup camera is available to replace the failed camera. In making this determination, VVC program 107 may reference the respective SoF array data structure of any camera of the set which is designated as a backup camera to identify a backup camera with an SoF array data structure having a converse value (e.g., 1) for the element which corresponds to the false-value element of the SoF array data structure of the failed camera. Where the SoF array data structure of the failed camera includes more than one element with false (e.g., 0) values, VVC program 107 may seek to identify a backup camera with an SoF array data structure having converse values for elements which correspond to the false-value elements of the failed camera. Additionally, when determining whether a designated backup camera of the set is available, VVC program 107 may also reference a similarity matrix for the set of cameras and/or group assignments for cameras of the set to identify a backup camera with a similarity value, with respect to the failed camera, which exceeds a threshold level or is within a threshold range and/or a backup camera within a same group as the failed camera. In response to determining that a camera of the set which has been designated as a backup camera is available to replace the failed camera (step 306, "Y" branch), the volumetric video capture process 300 may proceed to step 308. In response to determining that a camera of the set which has been designated as a backup camera is not available to replace the failed camera (step 306, "N" branch), the volumetric video capture process 300 may proceed to step 310.

At 308, in response to determining that a designated backup camera of the set is available to replace the failed camera, VVC program 107 replaces the failed camera with the backup camera identified at step 306. According to at least one embodiment, replacement of the failed camera may include instructions from VVC program 107 to move the failed camera out of its position and to move the identified backup camera into the position previously occupied by the failed camera. Where the failed camera cannot be moved, replacement of the failed camera may include instructions from VVC program 107 to move the identified backup camera into a position next to the failed camera. Furthermore, upon replacing the failed camera with the identified backup camera, VVC program 107 may remove the backup designation from the identified backup camera and designate the camera for active volumetric capture.

Next, at 310, in response to determining that a designated backup camera of the set is not available to replace the failed camera, VVC program 107 determines whether another camera which is actively capturing volumetric video of the scene (i.e., a camera designated for active volumetric capture) is available to replace the failed camera. In making this determination, VVC program 107 may reference a table of assigned video capture priorities of areas and/or objects of the scene, along with their respective scene portion camera assignments, to identify a camera of the set which is actively capturing volumetric video of an area and/or object of the scene with a lowest assigned video capture priority or with an assigned video capture priority below a threshold value. For example, VVC program 107 may identify a camera of the set which is capturing volumetric video of an area of the scene that can be generated using known AI/ML generative models in post-production and thus has a lowest assigned capture priority. Additionally, VVC program 107 may also reference the similarity matrix for the set of cameras and/or group assignments for cameras of the set to ensure that the identified camera possess a similarity value, with respect to the failed camera, which exceeds a threshold level or is within a threshold range and/or that the identified camera is within a same group as the failed camera. In response to determining that another camera which is actively capturing volumetric video of the scene is available (step 310, "Y" branch), the volumetric video capture process 300 may proceed to step 312. In response to determining that another camera which is actively capturing volumetric video of the scene is not available (step 310, "N" branch), the volumetric video capture process 300 may proceed to step 314.

According to at least one other embodiment, VVC program 107 may utilize known ML object detection models to continuously evaluate real-time video content captured by cameras of the set which are designated for active volumetric capture and, where applicable, classify captured video content as reproducible based on the captured content. Furthermore, the ML object detection models utilized by VVC program 107 may be trained to identify a least important camera which is designated for active volumetric capture based on the video content it is capturing, such as background or static objects of the scene which may be rendered artificially in post-production. Through continuous evaluation of captured real-time video content, VVC program 107 may update the table of assigned video capture priorities of areas and/or objects of the scene as volumetric video is being captured.

At 312, in response to determining that another camera which is actively capturing volumetric video of the scene is available, VVC program 107 replaces the failed camera with the camera identified at step 310. According to at least one embodiment, replacement of the failed camera may include instructions from VVC program 107 to move the failed camera out of its position and to move the identified other camera into the position previously occupied by the failed camera. Where the failed camera cannot be moved, replacement of the failed camera may include instructions from VVC program 107 to move the identified other camera into a position next to the failed camera. According to at least one other embodiment, VVC program 107 may replace the failed camera with an identified least important camera which is actively capturing volumetric video of the scene.

At 314, in response to determining that another camera which is actively capturing volumetric video of the scene is not available, VVC program 107 repositions all cameras of the set which are actively capturing volumetric video of the scene. According to at least one embodiment, repositioning of all cameras actively capturing volumetric video of the scene may include instructions from VVC program 107 to move the cameras farther away from the scene such that the respective portion of the scene captured by each camera increases. Respective angles of camera elevation, with respect to their respective scene portion, may be maintained during such repositioning. In doing so, the area and/or object(s) within the portion of the scene lost by the failed camera may be captured by the rest of the cameras which are actively capturing volumetric video of the scene.

According to at least one further embodiment, VVC program 107 may utilize one or more existing ML models, in conjunction with monitoring SoF array data structures of cameras of the set, to predict failure(s) that may later occur while capturing volumetric video of the scene. VVC program 107 may train ML models using historical data sets of the cameras' respective past operations. In response to a predicted failure of a camera, VVC program 107 may replace the failed camera or rearrange cameras of the array as described in the above steps of volumetric video capture process 300.

It may be appreciated that FIGS. 2 and 3 provide only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

monitoring respective status of functionality (SoF) array data structures of a set of cameras tasked with capturing volumetric video of a scene, wherein the set of cameras comprises cameras designated as backup cameras and cameras designated for active volumetric capture;

detecting a failed camera of the cameras designated for active volumetric capture based on evaluation of an SoF array data structure of the failed camera;

in response to detecting the failed camera, determining whether a backup camera of the cameras designated as backup cameras is available to replace the failed camera; and in response to determining the backup camera is available, replacing the failed camera with the backup camera.

2. The method of claim 1, further comprising:

assigning respective video capture priority values to areas and objects of the scene;

assigning the cameras designated for active volumetric capture respective portions of the scene for volumetric capture;

defining a respective SoF array data structure for each camera of the set, wherein an SoF array data structure comprises binary elements that are individually indicative of a real-time status of a specified technical capability of a camera;

creating a similarity matrix for all cameras of the set, wherein the similarity matrix comprises an index of similarity values which denote a level of similarity between any two cameras of the set, and wherein a similarity value for two cameras is based on evaluation of respective technical capabilities of each camera; and grouping cameras of the set based on respective similarity values between cameras of a group meeting or exceeding a threshold value or based on respective similarity values between cameras of a group being within a threshold range.

3. The method of claim 2, wherein detecting the failed camera comprises detecting a false value for at least one binary element within the SoF array data structure of the failed camera.

4. The method of claim 2, wherein determining whether the backup camera is available further comprises:

determining that an SoF array data structure of the backup camera includes a converse value for an element which corresponds to a false-valued element of an SoF array data structure of the failed camera; and determining that a similarity value between the backup camera and the failed camera exceeds a threshold level or is within a threshold range.

5. The method of claim 2, further comprising:

in response to determining the backup camera is not available, determining whether another camera of the cameras designated for active volumetric capture is available to replace the failed camera;

in response to determining that another camera of the cameras designated for active volumetric capture is available, determining that the other camera captures an area or object of the scene with a lowest assigned video capture priority value or with an assigned video capture priority value below a threshold value;

determining that the other camera is within a same group as the failed camera; and replacing the failed camera with the other camera.

6. The method of claim 5, further comprising:

in response to determining that another camera of the cameras designated for active volumetric capture is not available, repositioning the cameras designated for active volumetric capture, wherein the repositioning comprises moving the cameras designated for active volumetric capture farther away from the scene.

7. The method of claim 1, further comprising:

utilizing one or more machine learning models, in conjunction with monitoring the respective SoF array data structures of the set of cameras tasked with capturing volumetric video of the scene, to predict a future failure of a camera designated for active volumetric capture, wherein the one or more machine learning models are trained on historical data sets of the set of cameras' respective past operations.

8. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

monitoring respective status of functionality (SoF) array data structures of a set of cameras tasked with capturing volumetric video of a scene, wherein the set of cameras comprises cameras designated as backup cameras and cameras designated for active volumetric capture;

detecting a failed camera of the cameras designated for active volumetric capture based on evaluation of an SoF array data structure of the failed camera;

in response to detecting the failed camera, determining whether a backup camera of the cameras designated as backup cameras is available to replace the failed camera; and in response to determining the backup camera is available, replacing the failed camera with the backup camera.

9. The computer system of claim 8, the method further comprising:

assigning respective video capture priority values to areas and objects of the scene;

assigning the cameras designated for active volumetric capture respective portions of the scene for volumetric capture;

defining a respective SoF array data structure for each camera of the set, wherein an SoF array data structure comprises binary elements that are individually indicative of a real-time status of a specified technical capability of a camera;

creating a similarity matrix for all cameras of the set, wherein the similarity matrix comprises an index of similarity values which denote a level of similarity between any two cameras of the set, and wherein a similarity value for two cameras is based on evaluation of respective technical capabilities of each camera; and grouping cameras of the set based on respective similarity values between cameras of a group meeting or exceeding a threshold value or based on respective similarity values between cameras of a group being within a threshold range.

10. The computer system of claim 9, wherein detecting the failed camera comprises detecting a false value for at least one binary element within the SoF array data structure of the failed camera.

11. The computer system of claim 9, wherein determining whether the backup camera is available further comprises:

determining that an SoF array data structure of the backup camera includes a converse value for an element which corresponds to a false-valued element of an SoF array data structure of the failed camera; and determining that a similarity value between the backup camera and the failed camera exceeds a threshold level or is within a threshold range.

12. The computer system of claim 9, the method further comprising:

in response to determining the backup camera is not available, determining whether another camera of the cameras designated for active volumetric capture is available to replace the failed camera;

in response to determining that another camera of the cameras designated for active volumetric capture is available, determining that the other camera captures an area or object of the scene with a lowest assigned video capture priority value or with an assigned video capture priority value below a threshold value;

determining that the other camera is within a same group as the failed camera; and replacing the failed camera with the other camera.

13. The computer system of claim 12, the method further comprising:

in response to determining that another camera of the cameras designated for active volumetric capture is not available, repositioning the cameras designated for active volumetric capture, wherein the repositioning comprises moving the cameras designated for active volumetric capture farther away from the scene.

14. The computer system of claim 8, the method further comprising:

utilizing one or more machine learning models, in conjunction with monitoring the respective SoF array data structures of the set of cameras tasked with capturing volumetric video of the scene, to predict a future failure of a camera designated for active volumetric capture, wherein the one or more machine learning models are trained on historical data sets of the set of cameras' respective past operations.

15. A computer program product, the computer program product comprising: one or more computer-readable storage medium and program instructions stored on at least one of the one or more computer-readable storage medium, the program instructions executable by a processor capable of performing a method, the method comprising: monitoring respective status of functionality (SoF) array data structures of a set of cameras tasked with capturing volumetric video of a scene, wherein the set of cameras comprises cameras designated as backup cameras and cameras designated for active volumetric capture; detecting a failed camera of the cameras designated for active volumetric capture based on evaluation of an SoF array data structure of the failed camera; in response to detecting the failed camera, determining whether a backup camera of the cameras designated as backup cameras is available to replace the failed camera; and in response to determining the backup camera is available, replacing the failed camera with the backup camera.

16. The computer program product of claim 15, the method further comprising: assigning respective video capture priority values to areas and objects of the scene; assigning the cameras designated for active volumetric capture respective portions of the scene for volumetric capture; defining a respective SoF array data structure for each camera of the set, wherein an SoF array data structure comprises binary elements that are individually indicative of a real-time status of a specified technical capability of a camera; creating a similarity matrix for all cameras of the set, wherein the similarity matrix comprises an index of similarity values which denote a level of similarity between any two cameras of the set, and wherein a similarity value for two cameras is based on evaluation of respective technical capabilities of each camera; and grouping cameras of the set based on respective similarity values between cameras of a group meeting or exceeding a threshold value or based on respective similarity values between cameras of a group being within a threshold range.

17. The computer program product of claim 16, wherein detecting the failed camera comprises detecting a false value for at least one binary element within the SoF array data structure of the failed camera.

18. The computer program product of claim 16, wherein determining whether the backup camera is available further comprises: determining that an SoF array data structure of the backup camera includes a converse value for an element which corresponds to a false-valued element of an SoF array data structure of the failed camera; and determining that a similarity value between the backup camera and the failed camera exceeds a threshold level or is within a threshold range.

19. The computer program product of claim 16, the method further comprising: in response to determining the backup camera is not available, determining whether another camera of the cameras designated for active volumetric capture is available to replace the failed camera; in response to determining that another camera of the cameras designated for active volumetric capture is available, determining that the other camera captures an area or object of the scene with a lowest assigned video capture priority value or with an assigned video capture priority value below a threshold value; determining that the other camera is within a same group as the failed camera; and replacing the failed camera with the other camera.

20. The computer program product of claim 19, the method further comprising: in response to determining that another camera of the cameras designated for active volumetric capture is not available, repositioning the cameras designated for active volumetric capture, wherein the repositioning comprises moving the cameras designated for active volumetric capture farther away from the scene.

* * * * *